United States Patent [19]

Wohlgemuth

[11] Patent Number: 5,589,204
[45] Date of Patent: Dec. 31, 1996

[54] BOTTLE MOLD WITH ADJUSTABLE NECK BLOCK

[76] Inventor: Emanuel E. Wohlgemuth, 1381 Pea Pond Rd., North Bellmore, N.Y. 11710

[21] Appl. No.: 491,552

[22] Filed: May 16, 1995

[51] Int. Cl.$^6$ ................................................. B29C 49/76
[52] U.S. Cl. ........................ 425/182; 249/102; 264/533; 425/525
[58] Field of Search .................................. 425/185, 190, 425/191, 192 R, 182, 195, 522, 525, 533; 249/102, 103, 155, 158, 159; 264/533

[56] References Cited

U.S. PATENT DOCUMENTS

| | | | |
|---|---|---|---|
| 3,264,684 | 8/1966 | Moslo | 425/525 |
| 3,868,202 | 2/1975 | Valyi | 425/533 X |
| 3,892,829 | 7/1975 | Uhlig | 425/525 X |
| 3,941,539 | 3/1976 | Saumsiegle et al. | 425/525 |
| 4,254,933 | 3/1981 | Netto | 249/103 |
| 4,299,371 | 11/1981 | Duga | 425/525 X |
| 4,352,652 | 10/1982 | Barber | 425/533 X |
| 4,382,769 | 5/1983 | Younkin et al. | 264/533 X |
| 4,832,592 | 5/1989 | Saumsiegle | 425/525 |
| 5,474,438 | 12/1995 | Walker, Jr. | 425/185 |

*Primary Examiner*—Richard L. Chiesa
*Attorney, Agent, or Firm*—Hoffmann & Baron

[57] ABSTRACT

A neck-finish top block for use in a container blow-mold system has a base with a vertical parting face. A cam having a cam surface parallel with and separated by a horizontal distance from the vertical parting face rotatably engages the base. Rotation of the cam varies the horizontal distance. A separable heel including a vertical rear surface transverse to and parallel to the vertical parting face is engaged to the base and adapted for horizontal translation relative to and normal to the parting face, and has a cam follower surface for engaging the cam surface such that variation of the horizontal distance varies the horizontal distance between the parting face and the rear surface and facilitates alignment of the parting surface and rear surface of the top block with the parting surface and rear surface of a standard container blow-mold, in spite of possible variations of the blow-mold size.

8 Claims, 11 Drawing Sheets

5,589,204

BOTTLE MOLD WITH ADJUSTABLE NECK BLOCK

FIELD OF THE INVENTION

This invention relates to an adjustable neck finish top block for a container blow-mold system which facilitates proper alignment of the top block and the main mold, and thereby reduces mold wear and improves molding.

BACKGROUND OF THE INVENTION

The blow-molding of plastic containers is well known and practiced worldwide. Blow-molding offers many advantages over other forms of container manufacturing.

Among these advantages are: the ability to produce containers at minimal cost and with minimal waste; the low start-up costs and mold making lead times in comparison to other manufacturing methods such as injection molding; the ability to produce irregular shaped and hollow containers; the ability to produce containers quickly and automatically; the ability to produce containers from a variety of materials having qualities suited to the specific application.

No other type of plastic processing offers the versatility, economy, and speed of blow-molding for producing plastic containers.

Blow-molds for producing such containers are commonly made of aluminum. Aluminum offers several advantages. Among those are: ease and economy of mold manufacture; light weight; efficient heat transfer. Because the process pressures and clamping forces during blow-molding are relatively low and mold erosion from the flow of molten plastic is not a factor, aluminum is amply strong and wear resistant for blow-molding, where other processes, such as injection molding, require the use of hardened steel. The relative softness of aluminum does however subject the mold to damage, such as during maintenance, and wear, such as when the mold halves do not correctly mate and cooperate. These factors, combined with the high production rates common to blow-molding, lead to the need for regular maintenance on and restoration of the aluminum molds. For instance, the matching parting faces of the mold halves must often be repaired or refaced. This refacing usually results in a reduction of the overall depth of the mold, measured from the back side of one mold half to the back side of the other across the parting face. Although a standard mold half depth of four and three-quarters inches is normally provided on new molds, that dimension is reduced with each such refacing.

Blow-molded containers having specially formed neck finishes are commonly employed for use with container closures. Neck finishes may be threaded for use with threaded closures, adapted for mating with snap-on closures, etc. It is common within a container blow-mold system to employ a main mold to form the container reservoir, and a neck block, or top block, to form the neck finish. Top blocks are also made to standard dimensions so that the parting face of the top block and main mold properly match. The main mold is usually adapted to interchangeably accept any standard top block for a particular container size or style. Top blocks and main molds are generally aligned visually by being loosely engaged, tapped into alignment such as with a mallet, then firmly affixed together. The back side of each mold half, and the back side, or heel, of each top block, are affixed to a planar mounting or back plate. Such tapping and rigid engagement, usually by steel bolts driven into threaded holes in the main mold, may cause damage and wear to the mold system, particularly when performed repeatedly as is common. Provided that the depth of the main mold half, from its parting face to its back side, is exactly equal to the depth of the top block half, from its parting face to its heel, the mold system can be properly aligned and effective molding can be performed therein. However, even though the top blocks and made molds are originally made to standard dimensions, extremely tight dimensional tolerances must be expensively met to prevent mismatching of the parting faces. When making a new mold system, it is more often economically advantageous to kit or match machine the mold halves to the top block halves to increase the likelihood of an acceptable parting line match.

During blow-molding, a parison of molten plastic is extruded between the open mold system, then the mold system closes to entrap the parison within the mold cavity. A hollow blow pin is inserted through the neck opening and into the parison where it inflates the parison with pressurized air to cause the parison to form to the shape of the container and neck finish cavity. The blow pin includes a hardened steel bushing, or shear bushing, having an annular blade, and each top block half includes a semi-circular hardened steel blade, or shear steel. When the mold is closed, the semi-circular blades and seals form annular orifices around the shear bushing. During molding, portions of the parison extending beyond the mold cavity are trapped between the parting faces of the mold halves and become unwanted flash. After the container is formed within the cavity and before the mold system reopens to release the blow-molded container, the shear bushing is retracted through the shear steel orifice. The shear bushing and shear steels are sized and shaped so that the retraction causes a shearing of the container opening through the neck, whose diameter is that of the shear bushing blade and shear steel orifice. After the molded container is removed from the mold, flash is removed by trimming in an automated process.

Misalignment of the main mold and top block parting faces will result in many problems during attempted molding. Among those are: unusual and hastened wear of the parting faces; excessive and untrimmable molding flash; concentrated and extreme pressures on areas of the mold; and improper shearing of the container opening.

The neck finish features are often the most detailed components of the mold system, having many features and requiring the highest degree of accuracy in manufacture. For instance, the mating halves of a threaded neck finish must match precisely and prevent mold flash to ensure that the container closure will properly fit onto the neck and seal the container opening. Interchangeable mold inserts are commonly employed within the top blocks to simplify and reduce the cost and time of making changes to the neck finish type. As a result, it is not so common to recondition or repair the top block itself as it is to recondition or repair a main mold which generally includes an integral cavity. This fact creates a problem and burden when main mold reconditioning or repair is required. Because the main mold depth will be reduced by such maintenance, the top block must also be reworked only to maintain an equal depth as the main mold, for proper alignment thereafter, or else a relief pocket must be precisely cut into the back plate to accommodate the new position of the top block's tail end. This causes an additional and unnecessary burden to the reconditioning process.

SUMMARY AND OBJECTS OF THE INVENTION

The present invention is a top plate for a blow-mold system having a movable heel to provide top plate depth adjustment by simple rotation of a heel positioning cam within the top block.

It is the object of the present invention to eliminate the need for precise sizing of the top block depth to match the main mold depth.

It is the object of the present invention to eliminate the need for top block reworking when the main mold is reworked.

It is the object of the present invention to eliminate the need for relieving the back plate when the main mold is reworked.

It is the object of the present invention to improve the accuracy and reduce the time and complexity of parting face alignment both during initial mold set-up and after mold rework.

It is the object of the present invention to extend mold system life by reducing the damage and wear caused by the old alignment method.

The present invention will be best understood in view of the preferred embodiment disclosed and described herein and the appended drawings of which the following is a brief description.

DESCRIPTION OF THE PREFERRED EMBODIMENTS OF THE INVENTION

Figure 1:
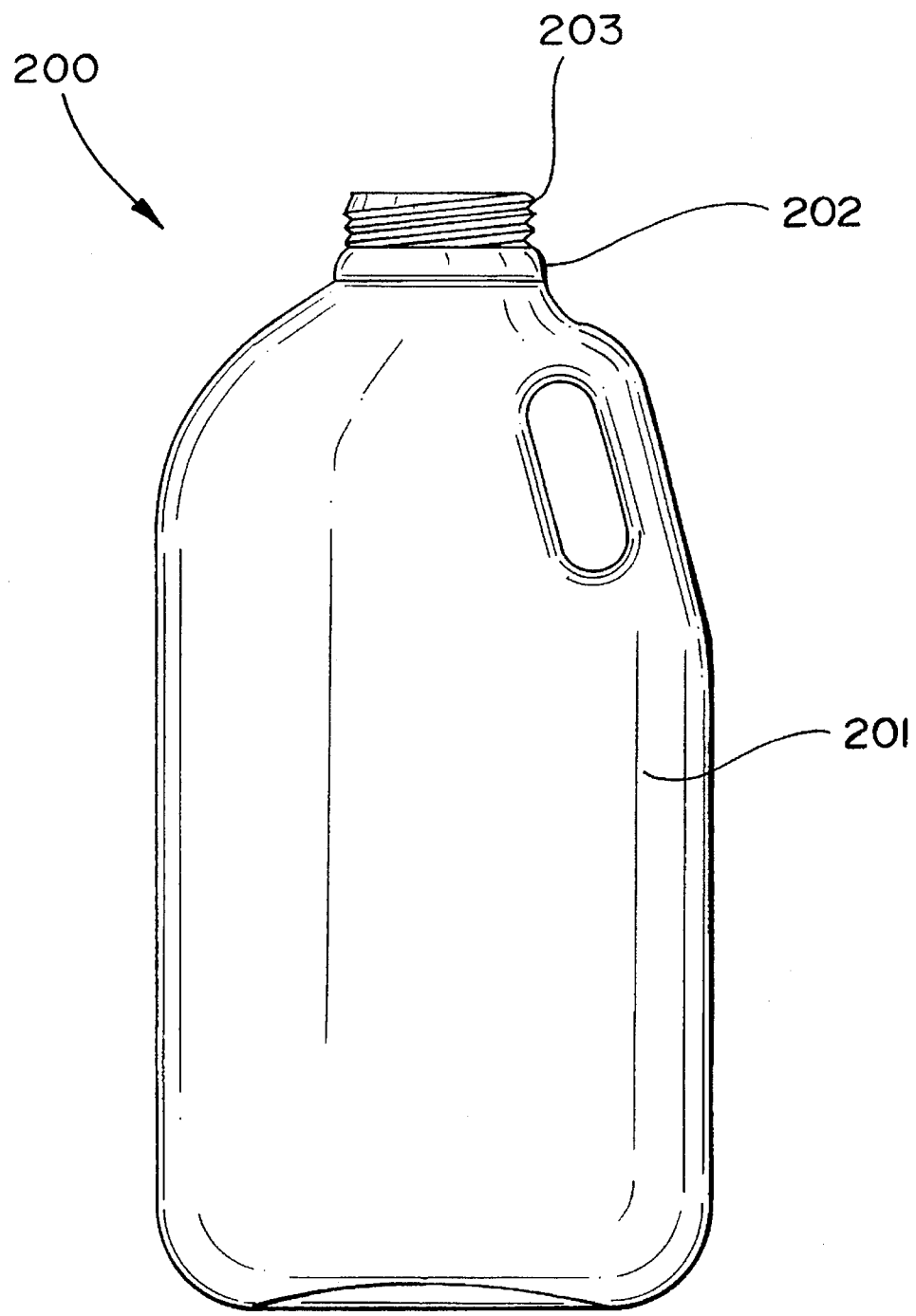
FIG. 1 is a front view of a typical prior art blow-molded container applicable to the present invention.
Figure 2:
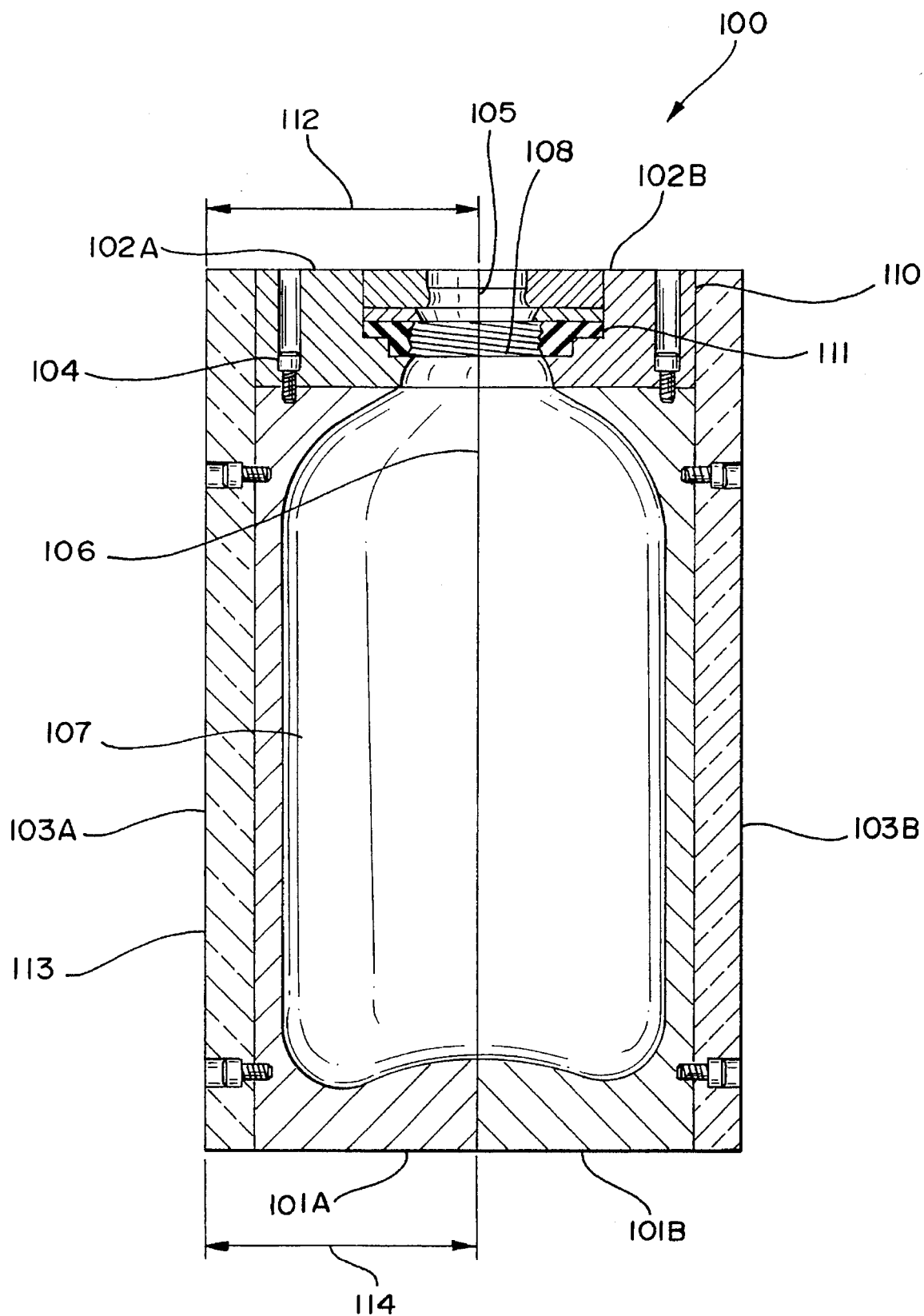
FIG. 2 is a cross-sectional side view of a typical prior art blow-mold system applicable to the present invention.
Figure 3:
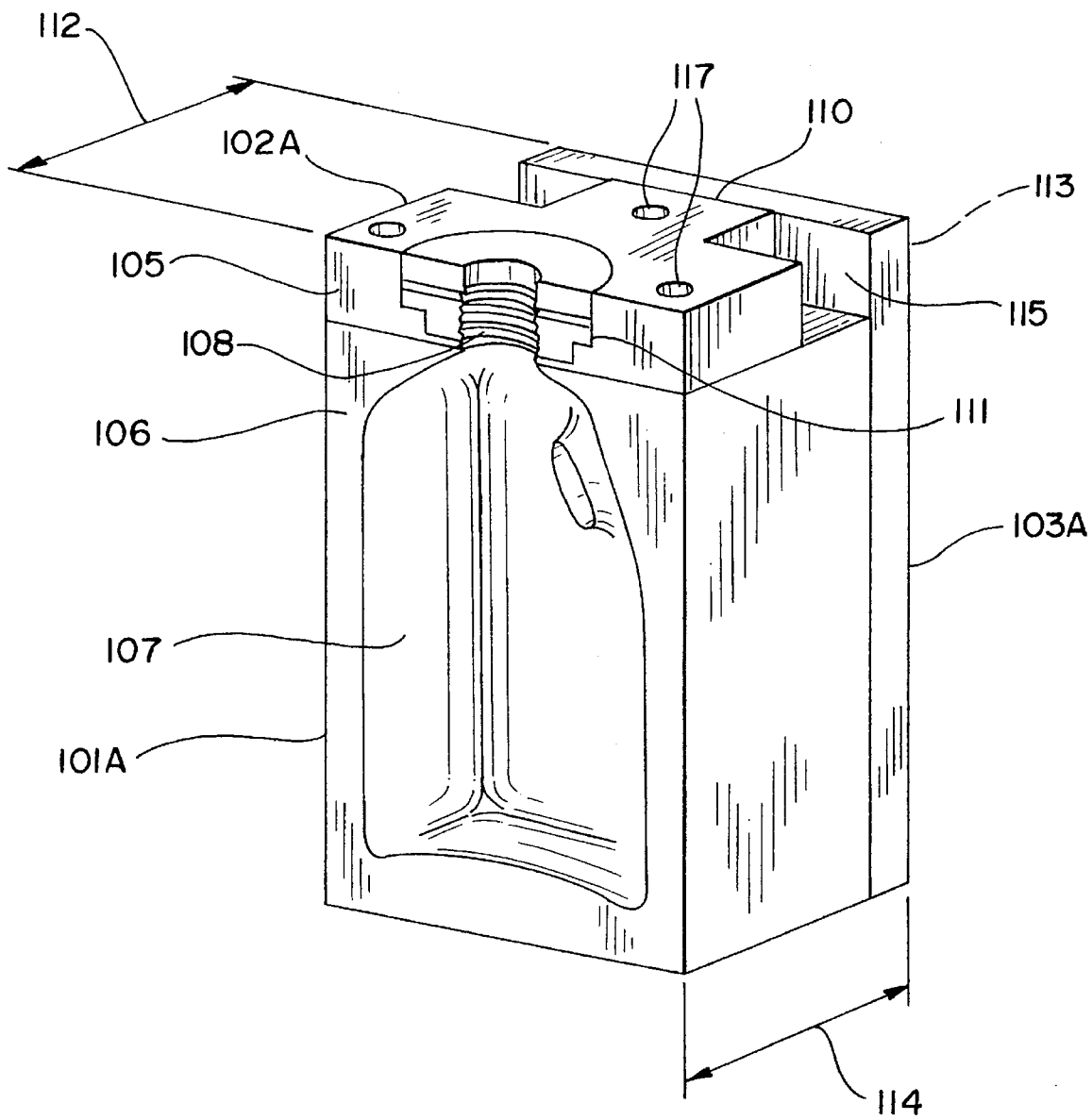
FIG. 3 is a partial perspective view of the blow-mold system of FIG. 2.
Figure 4:
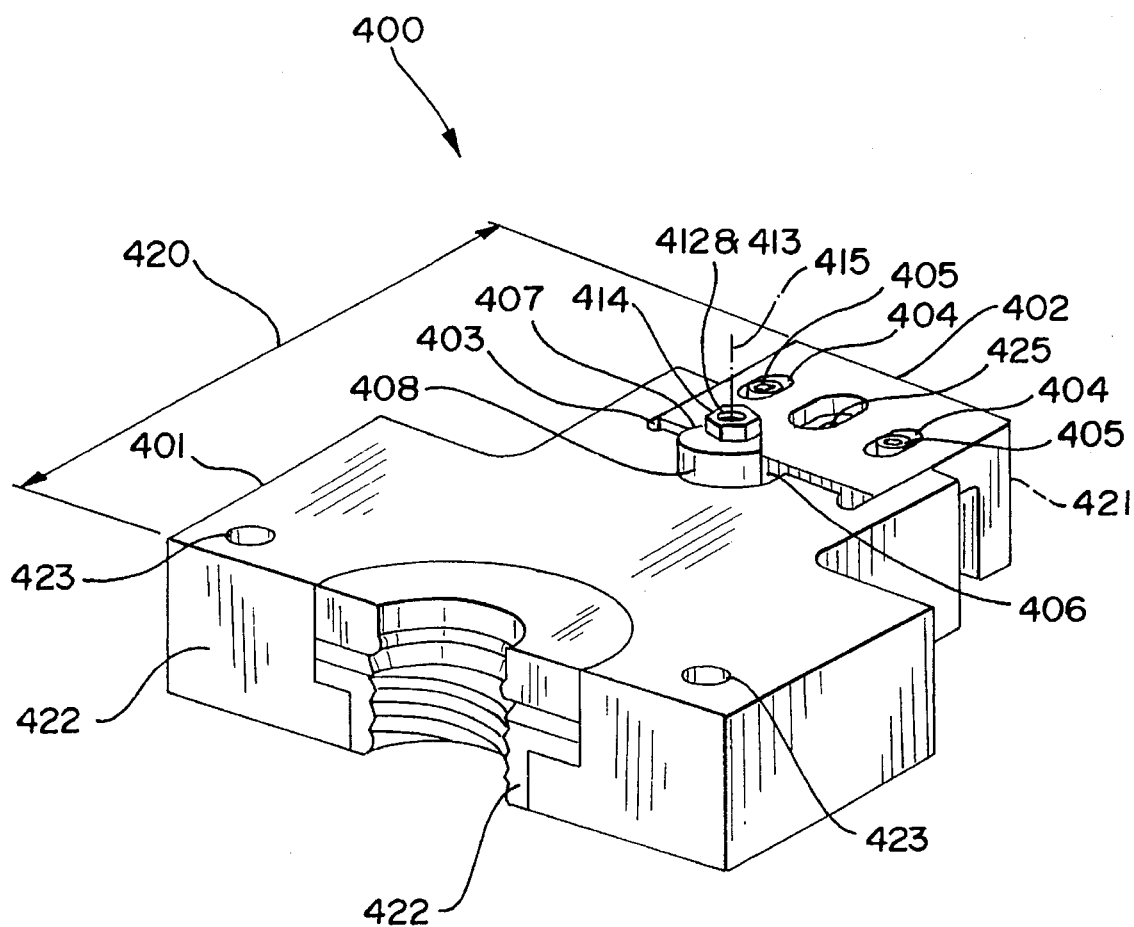
FIG. 4 is a perspective view of an adjustable depth top block according to the present invention.
Figure 5:
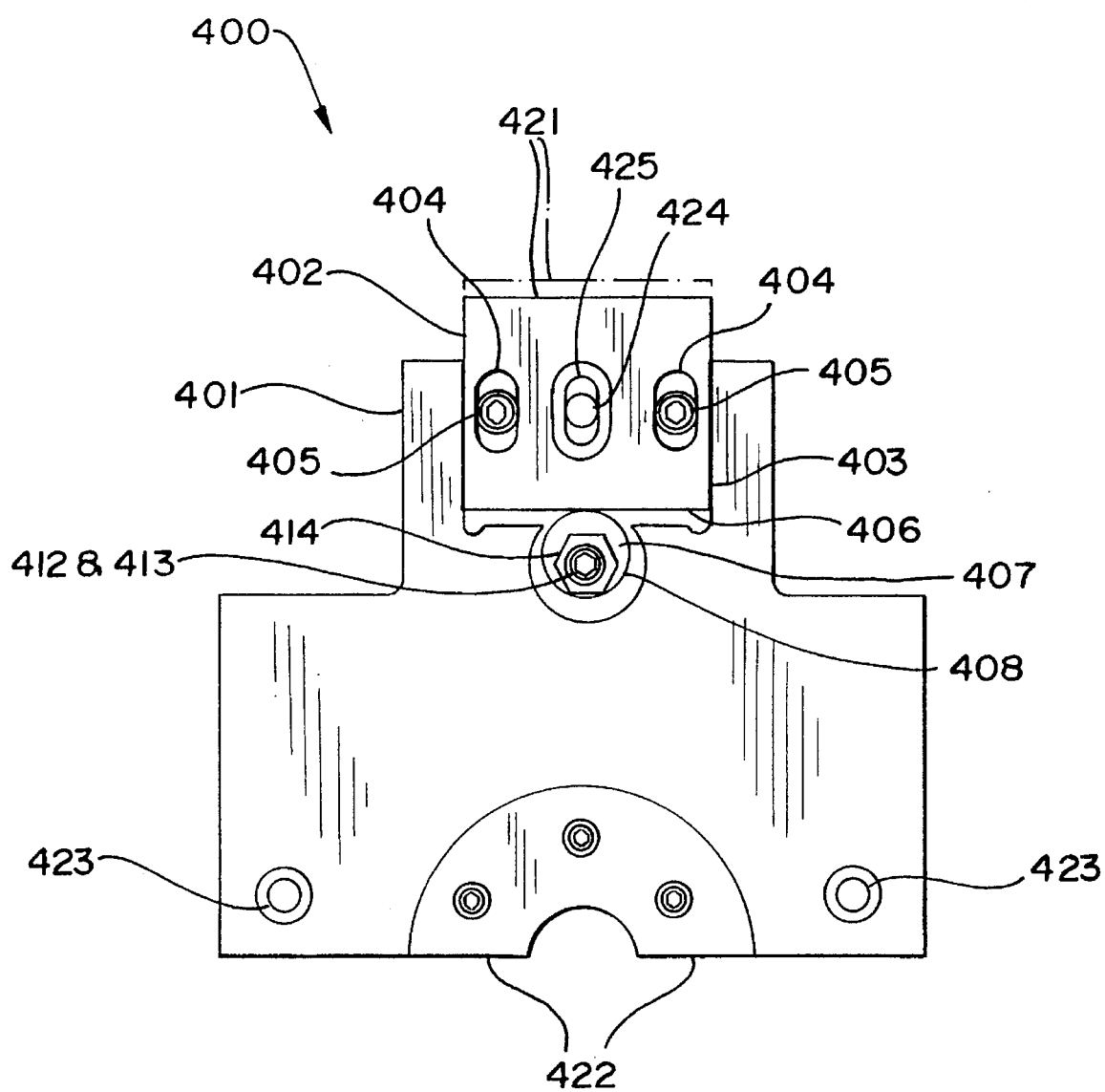
FIG. 5 is a top view of the top block of FIG. 4.
Figure 6:
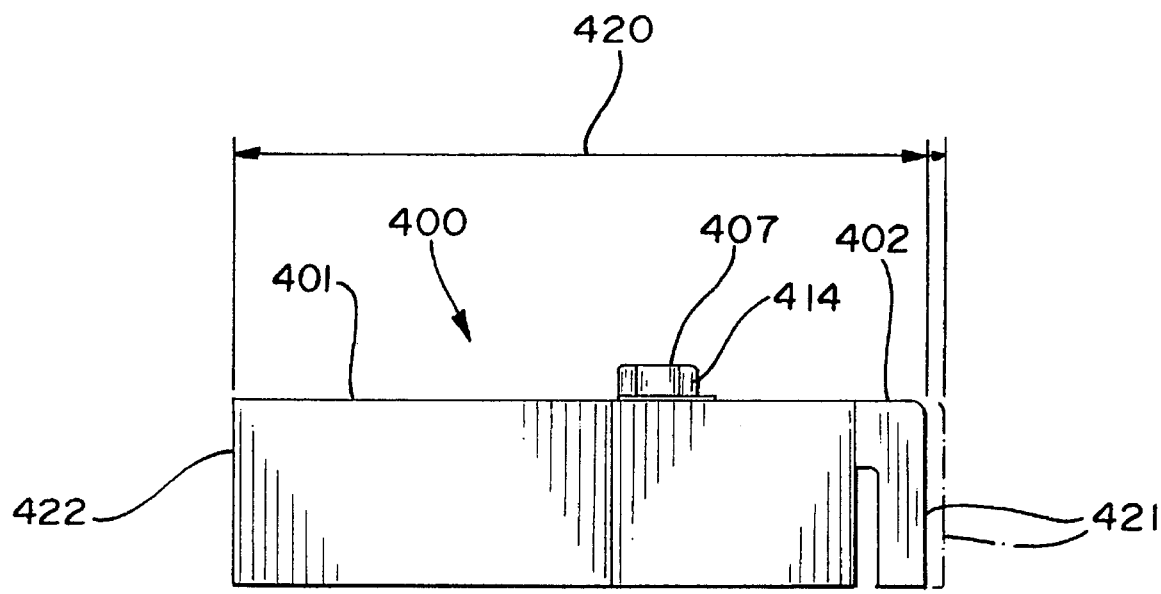
FIG. 6 is a side view of the top block of FIG. 4.
Figure 7:
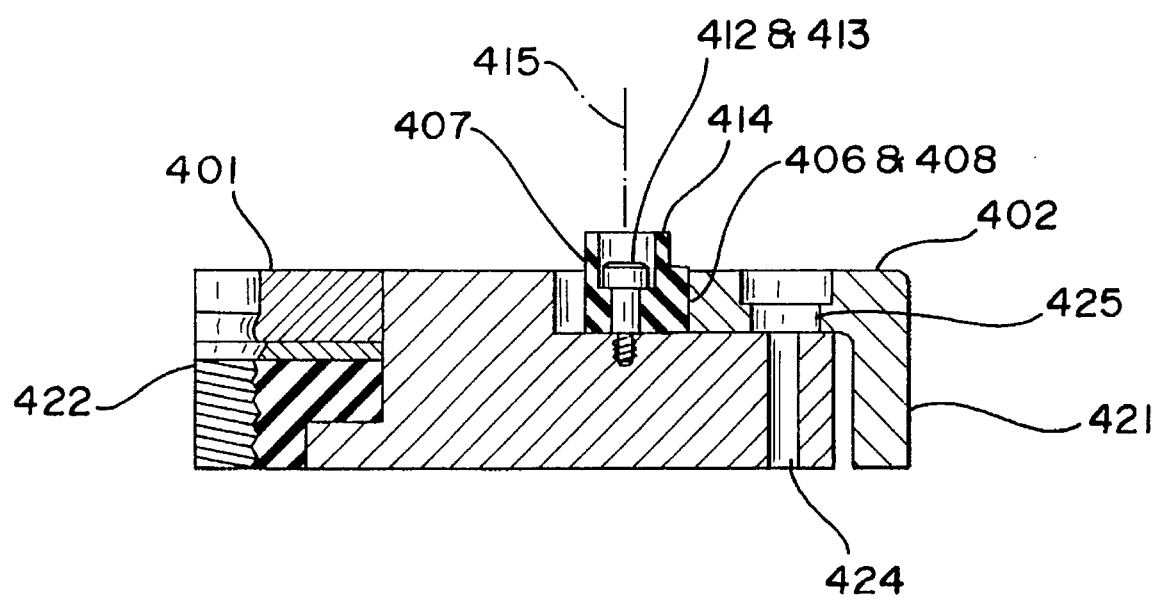
FIG. 7 is a cross-sectional side view of the top block of FIG. 4.
Figure 8:
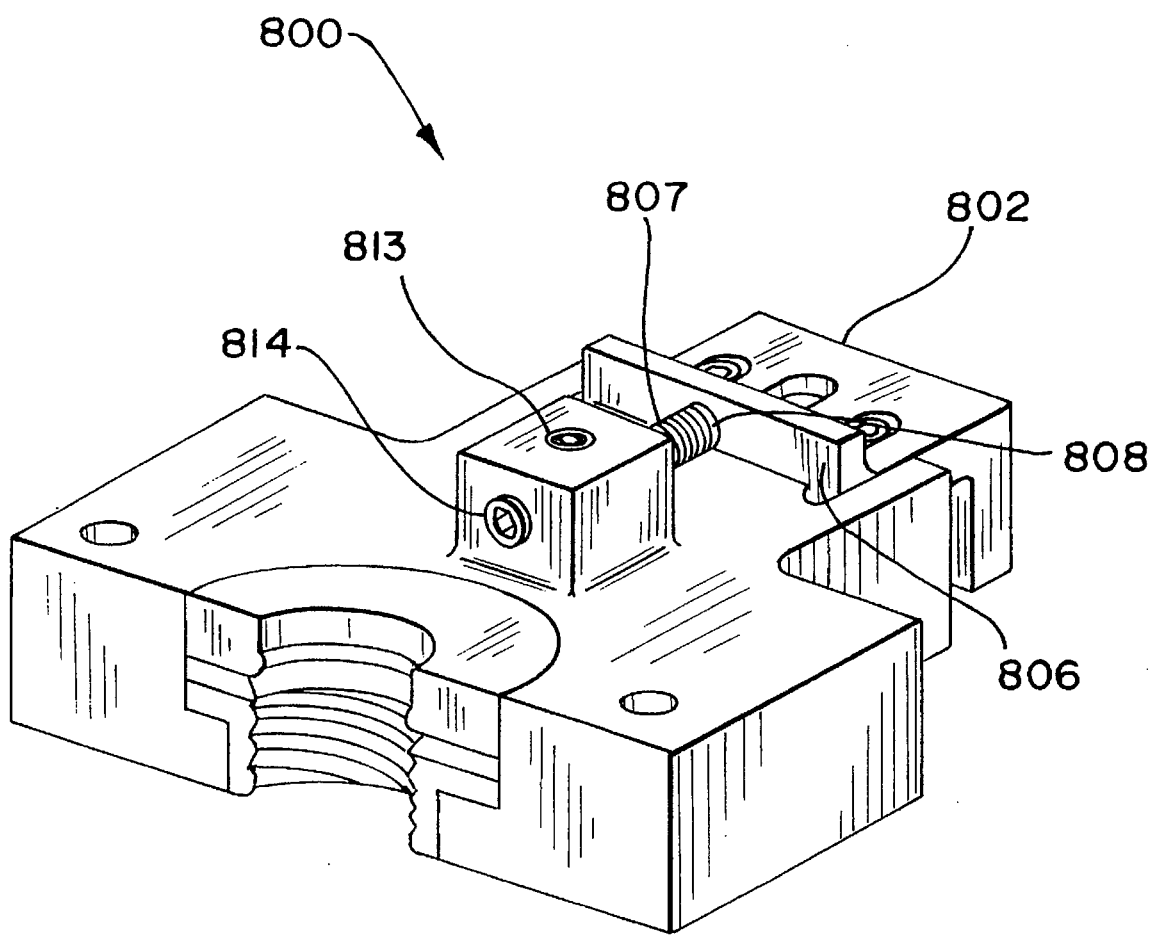
FIG. 8 is a perspective view of another adjustable depth top block according to the present invention.
Figure 9:
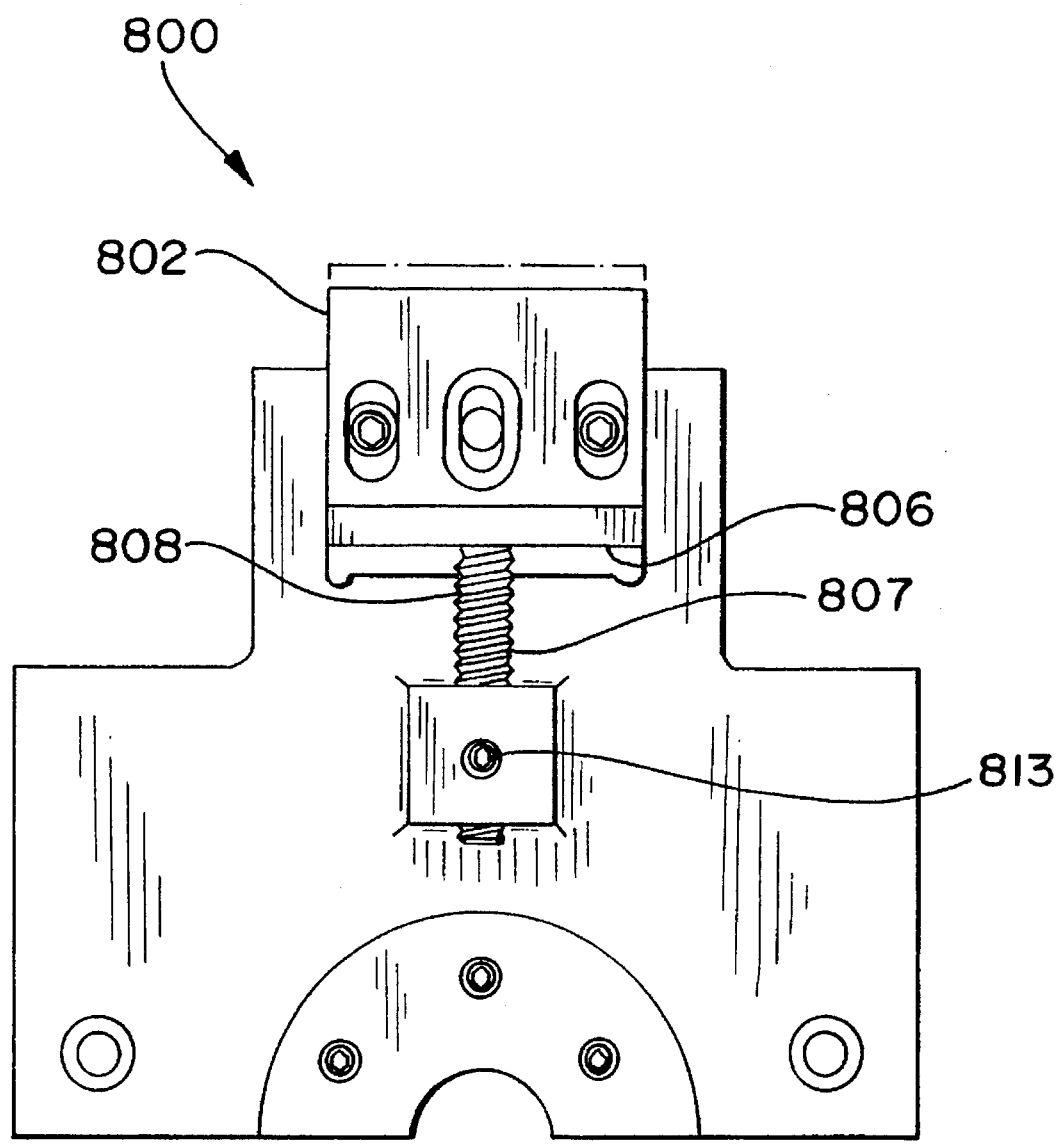
FIG. 9 is a top view of the top block of FIG. 8.
Figure 10:
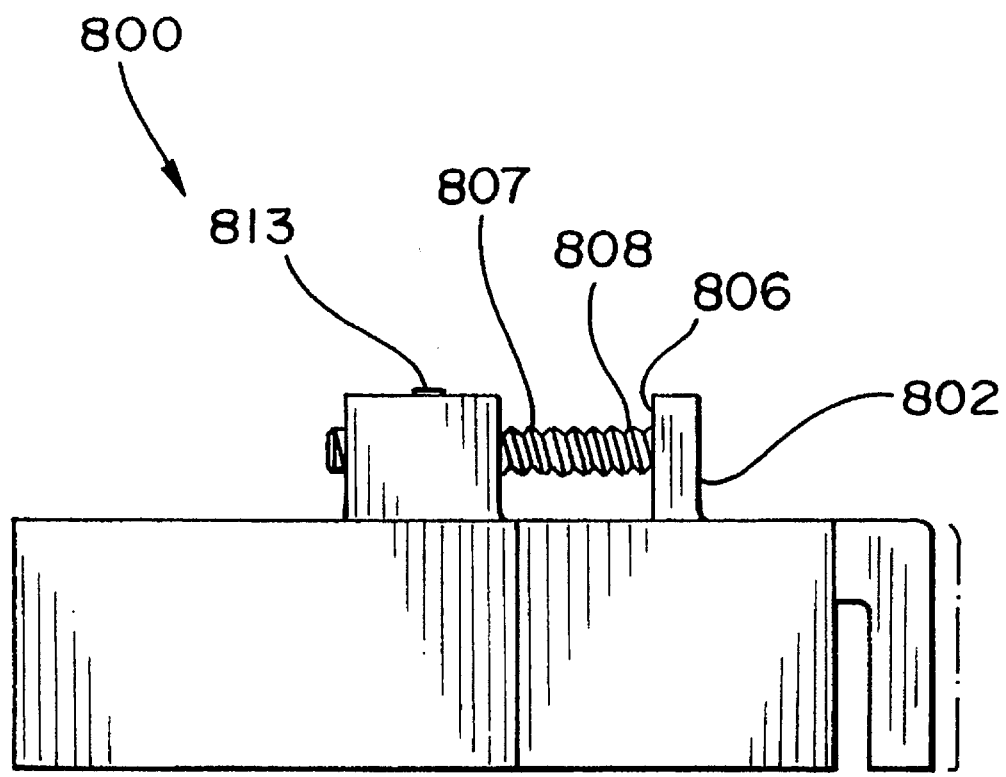
FIG. 10 is a side view of the top block of FIG. 8.
Figure 11:
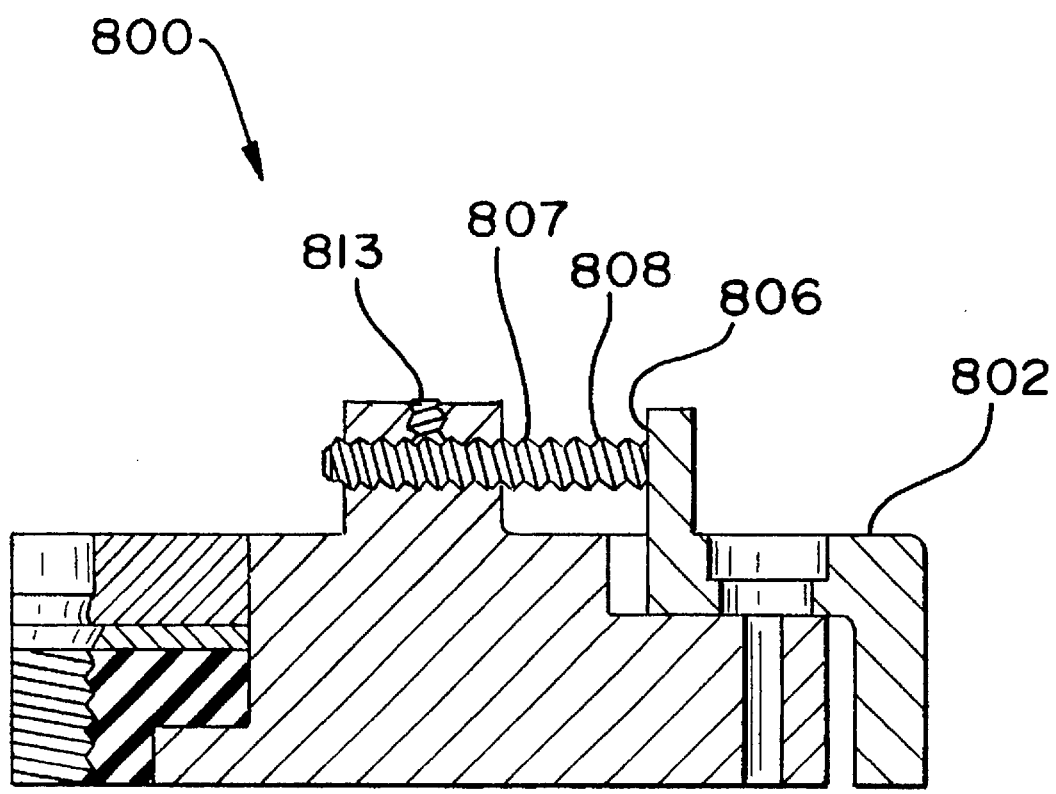
FIG. 11 is a cross-sectional side view of the top block of FIG. 8.

The present invention is best understood by reference to the prior art depicted in FIGS. 1 through 3, the preferred embodiment depicted in FIGS. 4 through 7, and another embodiment depicted in FIGS. 8 through 11.

Referring first to the prior art, a typical mold system 100 is comprised of two main mold halves 101A and 101B, two top block halves 102A and 102B, and two back plates 103A and 103B. Main mold half 101A is affixed to back plate 103A which in turn is mounted within an extrusion blow-molding machine. Top block half 102A is affixed atop main mold half 101A by machine bolts 104 through screw-holes 117 such that top block parting face 105 is aligned with main mold parting face 106. The opposing main mold and top block halves are similarly assembled, with further attention that the matching mold halves and top blocks mate properly to each other. Reservoir cavity 107 is formed by the mating of the mold halves such that container 200 may be formed therein.

Container 200 includes reservoir portion 201 and neck portion, 202. The neck portion includes helical threading 203 therearound. The mating top block halves form a thread cavity 108 for forming the container neck threading 203 therein. Each top block halve comprises base portion 110 and neck finish insert 111. The neck finish inserts are removable from the base portion for interchangeability and replacement.

After assembly and alignment, top block parting face 105 must be precisely aligned with main mold parting face 106 to ensure proper molding and minimal mold wear. In order to accomplish this, top plate depth 112, measured from back mounting surface 113 of the back plate 103A to top block parting face 105, must be equal to main mold depth 114, equivalently measured. Further, the parting faces must each be held parallel to the back plate.

Referring now to FIGS. 4 through 7 and the preferred adjustable top block assembly 400 of the present invention, movable aluminum heel 402 is attached to aluminum top block base 401 within longitudinal groove 403. The movable heel includes two longitudinal guide-slots 404 and is held within the groove by two heel mounting shoulder screws 405 which allow longitudinal translation of the heel within the groove. The forward face 406 of the movable heel engages rotatable eccentric cam 407 at cylindrical cam surface 408. The cam includes through-hole 412 and is affixed to base 401 by cam mounting shoulder screw 413. Loosening of screw 413 allows rotation of the cam, while tightening locks the cam to deny such.

The cam is adapted such that a standard wrench may engage external hex feature 414 while a hex driver may engage screw 413. This allows that the properly rotated cam may be held in position by a wrench while the screw is tightened, to avoid unintended rotation from the torque of tightening the screw.

The cylindrical cam surface 408 is eccentric about cam axis 415, so that the distance from the axis to the cam surface or the cam throw, varies about the axis. Rotation of the cam about the axis causes more or less throw by the cam and longitudinally moves the point of engagement of the heel's forward face accordingly. This simultaneously allows longitudinal translation of the heel. Such longitudinal translation causes a variation in the top block depth 420, measured from the heel's tail face 421, transverse the top block, to the parting face 422.

Screw-holes 423 and 424 are positioned in a standard mounting-hole pattern through the base 401 to allow mounting to a standard main mold half. Screw-slot 425 is longitudinally positioned through the heel 402 and about screw-hole 424 to allow a mounting screw to pass through and affix the heel and base simultaneously to a standard main mold half.

Provided with a particular prior art main mold half such as that of FIGS. 2 and 3, tile present invention top block may be affixed and properly aligned to the main mold half 101A, with far more tolerance of the actual main mold depth 114.

First, mounting screws are positioned through forward screw-holes 423 and into the main mold half 101A. The main mold parting face 106 and present top block parting face 422 are aligned as required, then the mounting screws are tightened. Cam mounting shoulder screw 413 is loosened and the cam 407 is rotated until tile heel's tail face 421 seats snugly against the forward mounting face 115 of the back plate 103A. The cam mounting shoulder screw is now tightened and a mounting screw is positioned through screw-slot 425 and screw-hole 424 and tightened to secure the aligned assembly.

Because clamping forces during molding act to compress the tail end of the top plate towards the parting face, a longitudinal force is transmitted through the heel and acts radially towards the cam axis 415. It is found that a cam having an eccentrically disposed cylindrical cam surface seven-eighths of an inch in diameter and having a total throw, from maximum to minimum, of eighty-thousandths of an inch will adequately avoid forced rotation from such compressive forces, and thereby avoid an inadvertent change in top plate depth during molding.

Referring now to FIGS. 8 through 11, a second adjustable top block 800 according to the invention is presented in which the cam is a threaded lead-screw 807. The lead-screw is adapted with hex socket 814 to accept a hex driver. Locking screw 813 must be loosened to allow rotation of the lead-screw or tightened to deny such rotation. Rotation of the lead-screw varies the longitudinal position of the lead-screw's tail end 808 which engages the forward face 806 of the movable heel 802.

As will readily be appreciated by one skilled in the art, various embodiments of the invention may be obviously derived herefrom. Such are anticipated by the inventor and are within the scope of the invention herein claimed.

I claim:

1. A neck-finish top block for use in a container blow mold system and comprising:

a base having a parting face and a heel mounting surface perpendicular thereto, a heel engaging said heel mounting surface and adapted for longitudinal translation relative to said base and normal to said parting face and including a tail surface transverse to and parallel to said parting face and separated therefrom by a certain longitudinal distance, a cam engaging one of said base or said heel and rotatable about an axis fixed thereto, and having a displacement surface engaging the other of said base or said heel at a contact point, and adapted such that rotation of said cam causes longitudinal displacement of said contact point, and wherein said contact point displacement facilitates longitudinal translation of said heel and thereby facilitates variation of said certain longitudinal distance.

2. The neck-finish top block of claim 1 further comprising a cam rotation lock having an unlocked state for allowing cam rotation and a locked state for denying cam rotation.

3. The neck finish top block of claim 2 wherein said cam engages said base and said displacement surface engages said heel.

4. The neck finish top block of claim 3 wherein said displacement surface substantially comprises a cylinder disposed eccentrically about and parallel to said axis.

5. The neck finish top block of claim 4 further comprising a heel translation lock having an unlocked state for allowing heel translation and a locked state for denying heel translation.

6. The neck finish top block of claim 3 wherein said cam comprises a lead-screw coaxial with said axis.

7. The neck finish top block of claim 6 further comprising a heel translation lock having an unlocked state for allowing heel translation and a locked state for denying heel translation.

8. The neck finish top block of claim 2 wherein said rotatable cam further comprises means for rotational engagement by a standard wrench and said cam rotation lock includes driver engagement means, and wherein said cam and said lock are adapted for simultaneous engagement by said wrench and said driver.

* * * * *